Sept. 16, 1930.  W. F. CHURCH  1,775,812
MOLD
Filed June 10, 1929
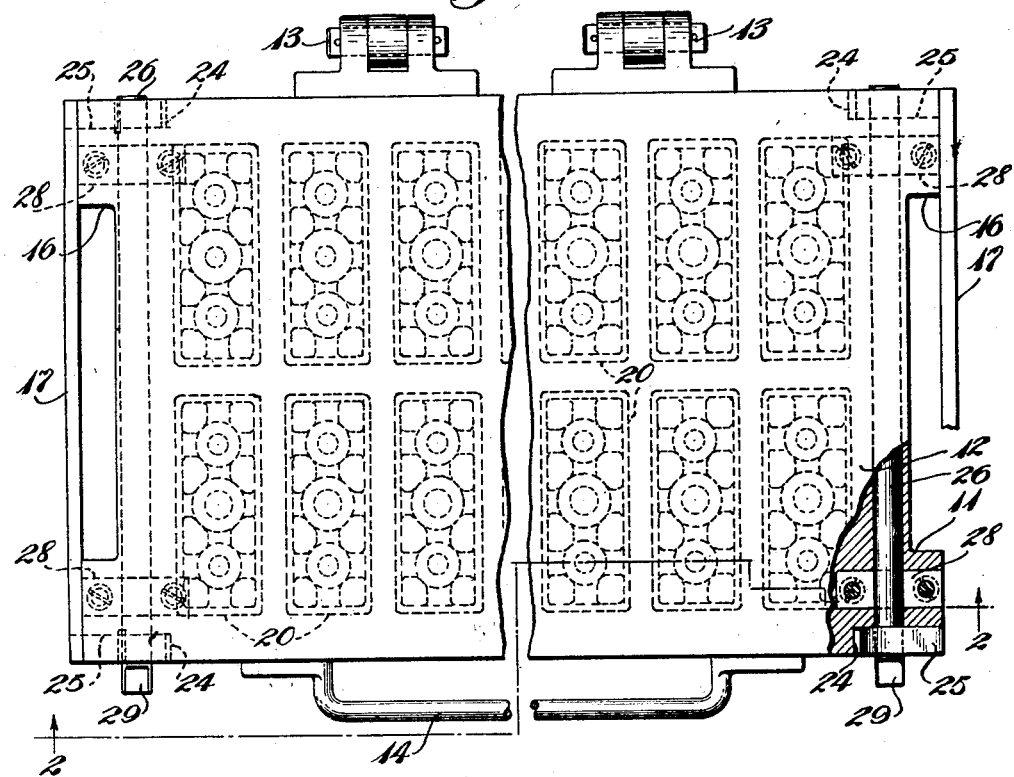
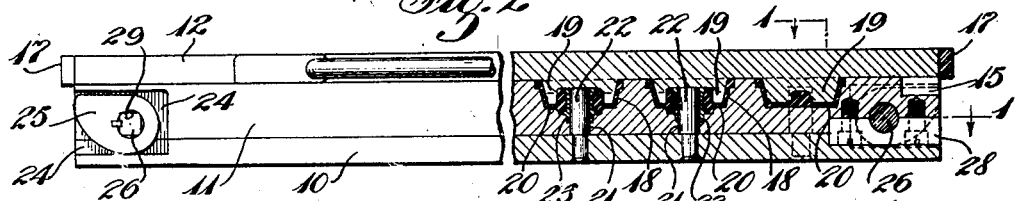
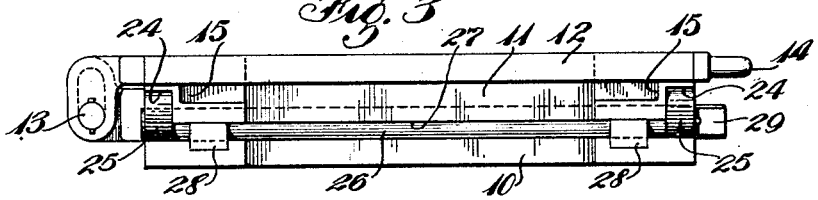
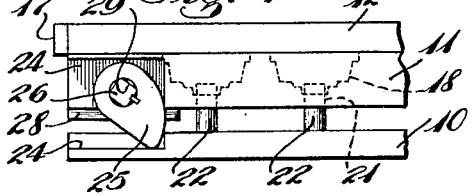
Inventor
William F. Church
By Eakin & Avery
Attys.

Patented Sept. 16, 1930

1,775,812

UNITED STATES PATENT OFFICE

WILLIAM F. CHURCH, OF AKRON, OHIO, ASSIGNOR TO THE B. F. GOODRICH COMPANY, OF NEW YORK, N. Y., A CORPORATION OF NEW YORK

MOLD

Application filed June 10, 1929. Serial No. 369,684.

This invention relates to molds and more especially to multiple cavity molds provided with positioning studs adapted to support inserts to be incorporated into the molded articles. For the purpose of illustration I show my invention herein applied to a mold for hard rubber battery jar covers, with the positioning studs of the mold engaging metal bushings which are molded into each of the covers.

In molds of the character mentioned as commonly used, the mold is made in two halves, one of which is formed with cavities and the other with elevations registerable with said cavities and provided with positioning studs. In the use of these molds, the metal bushings initially are forced into recesses in the mold cavities by pounding and require to be of sufficient strength to withstand heavy impacts. The mold member formed with elevations requires to be soaped to assure that the articles will remain in the other mold member when the mold is opened. Considerable difficulty also is experienced by reason of rubber getting between the positioning studs and the metal inserts, which rubber subsequently requires to be removed by an expensive reaming operation.

The chief objects of this invention are to provide an improved mold structure which will not require the metal inserts initially to be forced into place, thereby permitting the use of lighter inserts; to obviate the use of a lubricant for causing the finished articles to remain in the cavitied mold member when the mold is opened; and in a large measure to avoid the entry of rubber between the positioning studs and the metal inserts.

Of the accompanying drawings:

Fig. 1 is a plan view of a vulcanizing mold for battery jar covers, said mold embodying my invention in its preferred form, a part thereof being broken away and a part being in section on line 1—1 of Fig. 2.

Fig. 2 is a section on line 2—2 of Fig. 1.

Fig. 3 is a side elevation of the mold as viewed from the near side of Fig. 1.

Fig. 4 is a fragmentary elevation of the parts shown in Fig. 2 in different operative relation to each other.

Referring to the drawings, the mold comprises a base plate 10, an intermediate cavity plate 11, and a cover plate 12. The cavity plate 11 and cover plate 12 are hinged together at 13, 13 with lost-motion hinges mounted upon their rear faces, and the front face of the plate 12 is provided with a handle 14 for raising it. Recesses 15, 15 are formed in the top face of the cavity plate 11 adjacent the four corners thereof to admit suitable prying tools for assisting the raising of the cover plate 12. The cover plate 12 is formed with notches 16, 16 in its lateral margins and said notches are traversed by respective straps 17, 17 by means of which the mold may be engaged by a suitable tool for withdrawing it from a vulcanizing press.

As shown in Fig. 2, the cavity plate 11 is formed with a plurality of molding cavities 18, 18, and the cover plate 12 is formed with complemental elevations 19, 19, which with the aforesaid cavities define molding spaces for a plurality of battery jar covers 20, 20. The plate 11 is formed with through apertures 21, 21 extending into the respective cavities 18 from the bottom face of the plate, and cylindrical positioning studs 22, 22 are slidably mounted in the respective apertures 21 and secured to the underlying base plate 10. The studs 22 are adapted to position and support respective metal inserts or bushings 23, 23 which are molded into the battery jar covers 20, and said studs are slightly tapered to facilitate their removal from the work after the latter is molded and vulcanized, such removal being effected by separating the plates 10, 11 sufficiently to break the contact of the studs with the inserts.

For separating the plates 10, 11 a determinate distance, the respective corners of the plates 10, 11 are formed with recesses 24, 24 in which are positioned respective cams 25, 25 which are mounted upon the respective end portions of a pair of parallel shafts 26, 26 mounted in the cavity plate 11 adjacent the sides thereof, the plate 11 being cut away beneath the shafts as shown at 27, and the latter being secured in place by bearing blocks 28, 28. The end portions of the shafts 26 at the front of the mold are square as shown at 29 to receive respective socket wrenches by which the shafts are concurrently rotated to cause the cams 25 to separate the base plate 10 from the cavity plate 11 by lifting the latter. The angular movement of the shafts 26 is limited by the cams 25 which abut the walls of their recesses 24 at the end of their mold-separating movement, as is clearly shown in Fig. 4, and in such position the cams are over-center with relation to the vertical planes of the shafts 26 so that they will support the elevated mold plates.

In the operation of the improved mold, the loading of the mold is initiated with the cover 12 open and with the cavity plate 11 resting upon the base plate 10 so that the studs 22 project well within the mold cavities 18. Metal inserts 23 are then mounted upon the respective studs and manually pressed into their seats in the cavities 18, and strips of unvulcanized rubber composition are laid in the latter beside the inserts. The mold cover plate 12 is then closed, the mold mounted in a vulcanizing press which forces the cover plate into mating relation with the cavity plate 11 as shown in Fig. 2 and the articles vulcanized by the application of heat in the usual manner.

In removing the finished articles, the mold is opened by removing the cover plate 12, the articles remaining in the cavities 18 of the plate 11 by reason of their greater area of contact therewith, and the frictional engagement of the inserts 23 with the studs 22. The shafts 26 are then turned angularly to cause the cams 25 to separate the plate 11 from the base plate 10 whereby the studs 22 are moved axially of the inserts 23 and their frictional engagement therewith broken. The molded battery jar covers 20 are then easily removed from the mold cavities 18 in the usual manner.

The arrangement which permits the inserts 23 to be substantially fully seated upon the studs 22 before the mold is closed prevents rubber from flowing between the inserts and studs, an undesirable feature present in the prior practice. The absence of soap or other lubricant on the vulcanized articles simplifies the subsequent operation of straightening the bent or warped articles. The metal inserts are not required to be initially pounded or driven into seating engagement with the mold cavity, which permits thinner walled inserts to be used.

My invention may be modified within the scope of the appended claims, and I do not limit my claims wholly to the specific construction described.

I claim:

1. In a mold, the combination of a pair of mold members defining a plurality of molding cavities, a stud plate provided with a plurality of work-engaging studs extending into the respective cavities, and a plurality of cams interposed between the cavity plate and the stud plate for separating them a determinate distance.

2. A mold as defined in claim 1 including means for actuating the cams in unison.

3. A mold as defined in claim 1 in which the cams are disposed at the respective corners of the mold and are mounted in pairs upon rotatable shafts.

In witness whereof I have hereunto set my hand this 7th day of June, 1929.

WILLIAM F. CHURCH.